US 12,552,678 B2

(12) United States Patent
Lutz et al.

(10) Patent No.: US 12,552,678 B2
(45) Date of Patent: Feb. 17, 2026

(54) AMMONIA CAPTURE AND RECYCLE IN AN AMMONIA CRACKER

(71) Applicant: L'Air Liquide, Société Anonyme pour l'Etude et l'Exploitation des Procédés Georges Claude, Paris (FR)

(72) Inventors: Michael Lutz, Frankfurt am Main (DE); Lorenzo Vicari, Frankfurt am Main (DE); Swatantra Kumar Shrivastava, Lich (DE); Dieter Ulber, Steinbach (DE)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 342 days.

(21) Appl. No.: 18/133,611

(22) Filed: Apr. 12, 2023

(65) Prior Publication Data
US 2024/0343593 A1  Oct. 17, 2024

(51) Int. Cl.
*C01C 1/12* (2006.01)
*B01D 53/14* (2006.01)
(Continued)

(52) U.S. Cl.
CPC ............ *C01C 1/12* (2013.01); *B01D 53/1418* (2013.01); *C01B 3/047* (2013.01); *C01B 3/52* (2013.01);
(Continued)

(58) Field of Classification Search
None
See application file for complete search history.

(56) References Cited

U.S. PATENT DOCUMENTS 3,546,078 A * 12/1970 Kahre ...................... C01C 1/10
203/65
10,112,829 B2  10/2018 Ravikumar et al.
(Continued)

FOREIGN PATENT DOCUMENTS

CA    3 223 160      12/2022
CN    102688651 A  * 9/2012  ........... B01D 53/002
(Continued)

OTHER PUBLICATIONS

CN102688651A_ENG (Espacenet machine translation of Yin) (Year: 2012).*
(Continued)

*Primary Examiner* — Gabriel E Gitman
(74) *Attorney, Agent, or Firm* — Allen E. White

(57) ABSTRACT

A method of separating and reusing unconverted ammonia from cracked ammonia gas provided by an ammonia cracking unit is provided. The method includes introducing a cracked ammonia gas stream into a water wash column, thereby producing a clean gas stream and a water-containing effluent stream and introducing the water-containing effluent stream into a stripping column, thereby producing a cleaned wash water stream and a recovered ammonia stream. Wherein the cracked ammonia gas stream has an ammonia concentration of between 0.003 mol % and 10 mol %. Wherein the clean gas stream has an ammonia concentration of between 1 ppm and 2500 ppm. And wherein at least a portion of the recovered ammonia stream is used as fuel within the ammonia cracking unit.

12 Claims, 2 Drawing Sheets

(51) Int. Cl.
    *C01B 3/04*            (2006.01)
    *C01B 3/047*         (2026.01)
    *C01B 3/52*            (2006.01)

(52) U.S. Cl.
    CPC .... *B01D 53/1425* (2013.01); *B01D 2252/103* (2013.01); *B01D 2257/406* (2013.01); *C01B 2203/0415* (2013.01); *C01B 2203/0465* (2013.01); *C01B 2203/0811* (2013.01); *C01B 2203/0827* (2013.01); *C01B 2203/146* (2013.01)

(56) References Cited

U.S. PATENT DOCUMENTS

| | | | |
|---|---|---|---|
| 11,840,447 B1* | 12/2023 | Jo | C01B 3/047 |
| 2017/0203963 A1* | 7/2017 | Ravikumar | C01B 17/04 |
| 2018/0179125 A1* | 6/2018 | Radaelli | C01B 3/38 |
| 2022/0154646 A1* | 5/2022 | Araki | C01B 3/047 |
| 2023/0104624 A1* | 4/2023 | Al-Khowaiter | C01B 3/047 423/658.2 |
| 2024/0253982 A1* | 8/2024 | White | C01B 3/52 |

FOREIGN PATENT DOCUMENTS

| | | | |
|---|---|---|---|
| CN | 115092883 A * | 9/2022 | C01B 3/047 |
| WO | WO 2015/074127 | 5/2015 | |
| WO | WO 2021/257944 | 12/2021 | |
| WO | WO 2022/189560 | 9/2022 | |
| WO | WO 2022 243410 | 11/2022 | |

OTHER PUBLICATIONS

CN115092883A_ENG (Espacenet machine translation of Ji) (Year: 2022).*
International Search Report and Written Opinion for PCT/US2024/024300, mailed Jul. 31, 2024.
International Search Report and Written Opinion for PCT/US2024/024284, mailed Jul. 19, 2024.

* cited by examiner

AMMONIA CAPTURE AND RECYCLE IN AN AMMONIA CRACKER

BACKGROUND

The separation of ammonia from a gaseous or liquid stream is typically performed in various fields. For example, ammonia containing wastewater can be stripped with air. To enhance the ammonia transfer from the wastewater to the air, the pH-value of the wastewater can be increased. The ammonia containing air may then be subsequently washed with dilute sulfuric acid to form ammonium sulfate which may be used as a liquid fertilizer. Another option is stripping the alkalized wastewater with steam instead of air. Within a suitable process, a concentrated ammonia solution can be obtained which can be used for DeNOx units.

Ammonia removal from a gaseous stream typically plays an important role in ammonia synthesis. Typically, it is separated as a product via partial condensation at temperatures between −20° C. and 30° C. and pressure between 100 bar and 1000 bar. The technology is very mature.

For ammonia cracking applications, the use of a wash column is known in the art. Such cracked gas typically contains 8% ammonia and may be reduced to about 0.06% in the wash column. The ammonia may then be recovered via evaporation, cooled, compressed and recycled to the feed of the cracker.

In an industrial scale ammonia cracker, the desired product is typically hydrogen and/or nitrogen. Focusing on these products, the formation of potential undesired co-products should be avoided. Depending on the process conditions, a significant amount of unconverted ammonia, typically of up to 10%, may be present in the cracked gas. Washing with sulfuric acid to form ammonium sulfate is therefore not desired, as the ammonia to form ammonium sulfate is lost for hydrogen production.

Ammonia separation via its partial condensation requires cooling to subzero temperatures and preferably a high pressure. It is commonly used in ammonia synthesis. As the pressure of the cracked gas is lower than in ammonia synthesis and cooling requires significant effort, it is not the preferred method for ammonia separation. In addition, the remaining ammonia concentration in the off-gas may be as high as 5 mol % which may be too high for a downstream hydrogen purification step such as a temperature—or pressure swing adsorption (TSA/PSA).

The recovery of unconverted ammonia in an ammonia cracker with a water wash-column and recovery column is known in the art. The absorption of ammonia in a water wash column is favored at high pressure. In contrast, its desorption is favored at low pressures. If the ammonia is recovered at lower pressure, a recycle to the feed requires a compression step which requires additional capital expense (CAPEX) and operating expense (OPEX).

SUMMARY

A method of separating and reusing unconverted ammonia from cracked ammonia gas provided by an ammonia cracking unit is provided. The method includes introducing a cracked ammonia gas stream into a water wash column, thereby producing a clean gas stream and a water-containing effluent stream and introducing the water-containing effluent stream into a stripping column, thereby producing a cleaned wash water stream and a recovered ammonia stream. Wherein the cracked ammonia gas stream has an ammonia concentration of between 0.003 mol % and 10 mol %. Wherein the clean gas stream has an ammonia concentration of between 1 ppm and 2500 ppm. And wherein at least a portion of the recovered ammonia stream is used as fuel within the ammonia cracking unit.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

Figure 1:
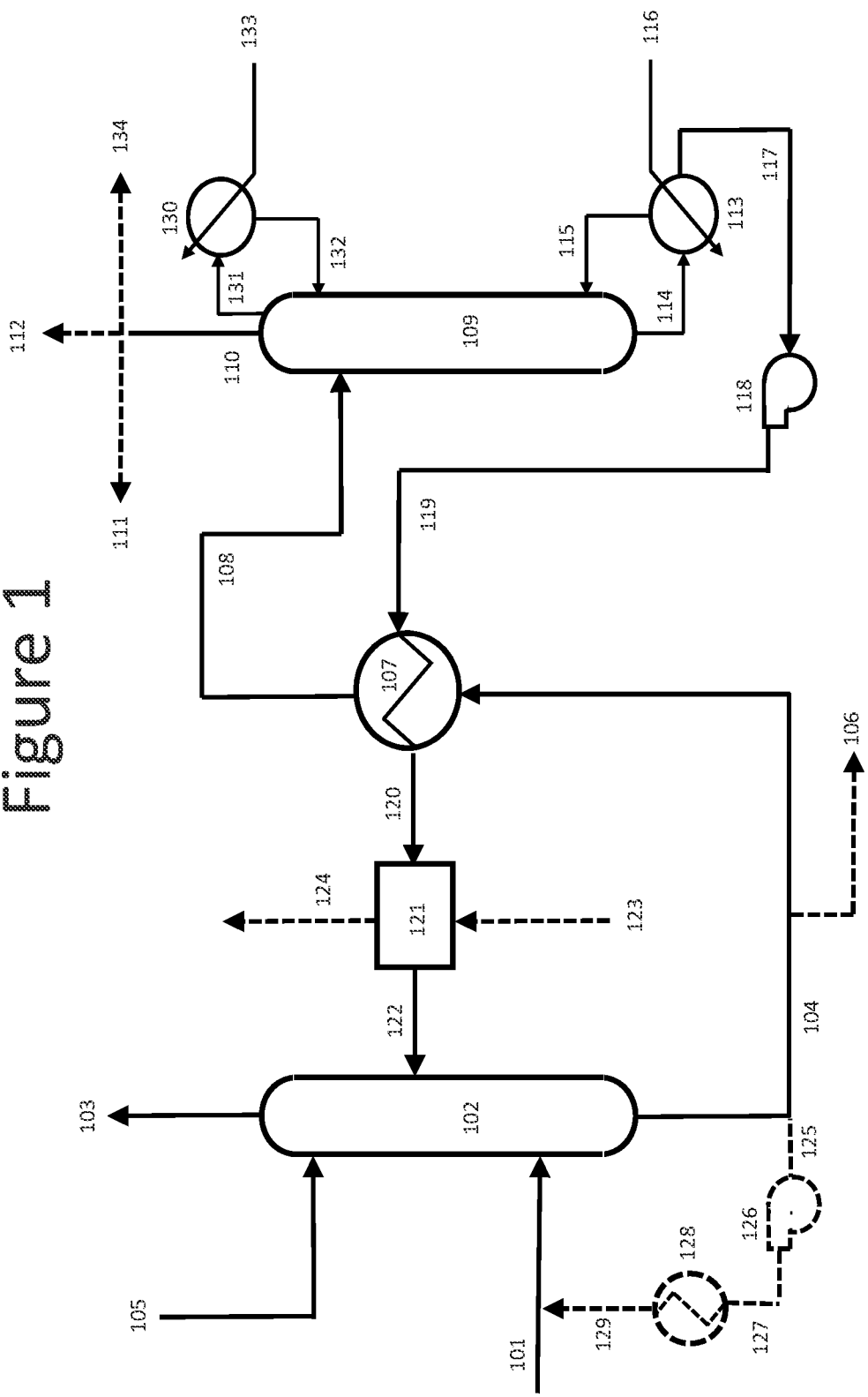
FIG. 1 is a schematic representation a method of separating cracked ammonia gas, in accordance with one embodiment of the present invention.

101=inlet stream
102=wash column
103=clean gas stream
104=wash column effluent stream
105=makeup water
106=first SCR stream (optional)
107=heat exchanger
108=cooled effluent stream
109=stripping column
110=recovered ammonia stream
111=ammonia fuel stream
112=second SCR stream (optional)
113=reboiler
114=reboiler liquid stream
115=reboiler vapor stream
116=reboiler heat input stream
117=cleaned wash water stream
118=wash water pump
119=pressurized wash water stream
120=warmed wash water stream
121=wash water cooler
122=cooled wash water stream
123=ammonia feed stream
124=warm ammonia feed stream
125=recycle stream
126=recycle pump
127=pressurized recycle stream
128=recycle cooler
129=cooled recycle stream
130=condenser
131=warm condenser stream
132=cold condenser stream
133=cold condenser inlet stream
134=recovered ammonia product stream
135=ammonia cracking unit
136=ammonia feed stream
137=ammonia storage tank
138=ammonia heat exchanger
139=warm ammonia stream
140=ammonia cracking reactor
141=hot cracked ammonia stream
142=cooled cracked ammonia stream
143=ammonia furnace fuel stream
144=ammonia furnace raw flue gas stream
145=selective catalytic reformer 146=ammonia stream for SCR
147=treated flue gas stream
148=hydrogen nitrogen separation unit
149=hydrogen-rich stream
150=nitrogen-rich stream

DESCRIPTION OF PREFERRED EMBODIMENTS

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

To overcome the mentioned problems regarding the ammonia separation from a gas stream, an innovative new process is proposed. The proposed process includes an ammonia water wash column and a stripper for the purification of the cracked gas in an ammonia cracker in which the energy for the ammonia cracking is provided via the combustion of an ammonia containing fuel mixture. The fuel includes of ammonia and/or hydrogen and/or nitrogen from cracked ammonia. Typical processes known in the art are different as the stripped gaseous ammonia is compressed and recycled to the feed. In contrast, the proposed process avoids the compression device and the gaseous ammonia is recycled to the fuel system. This way, the amount of external ammonia for ammonia cracking can be reduced. The present process makes use of the high-pressure (typically 20-35 bar) of the cracked gas for ammonia absorption and the lower pressure (typically 1-2 bar (a)) in the fuel system for ammonia desorption. Via thermal integration of the wash-stripping cycle, the fuel stream may be preheated. In addition, it is possible to extract an ammonia containing stream to use in a selective catalytic reduction (SCR, DeNox) unit for the removal of nitrous oxides. During the combustion of an ammonia containing fuel, significant amounts of NOx form, which have to be removed from the flue gas before venting it to the atmosphere.

Figure 2:
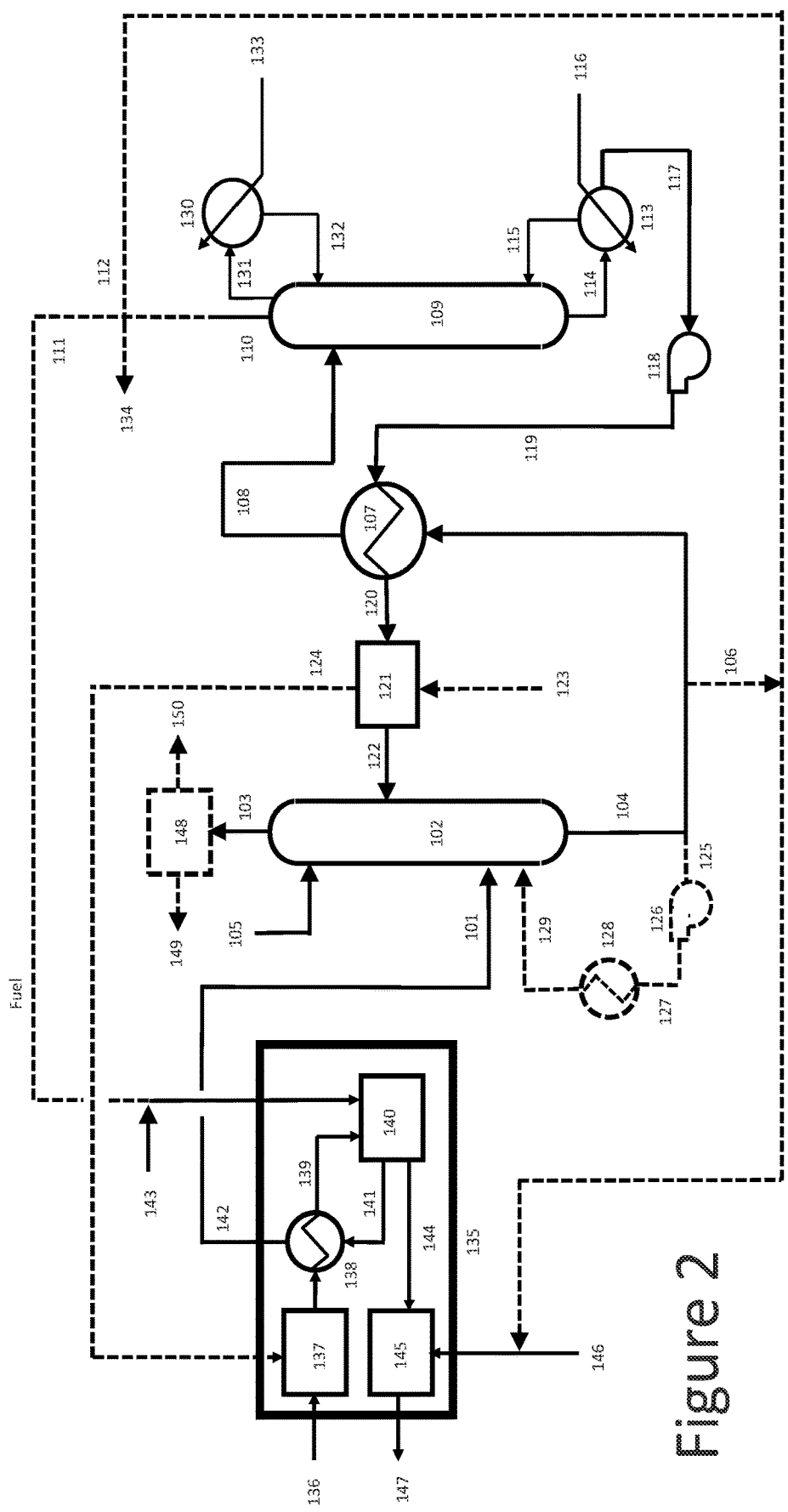
FIG. 2 is a schematic representation a method of separating cracked ammonia gas illustrating additional possible details, in accordance with one embodiment of the present invention.

Turning to FIG. 2, a basic ammonia cracking unit 135 is illustrated. Ammonia feed stream 136, and optionally warm ammonia feed stream 124, are introduced into ammonia storage tank 137. As needed, ammonia is taken from ammonia storage tank 137 and introduced into ammonia heat exchanger 138, wherein it indirectly exchanges heat with hot cracked ammonia stream 141, thereby producing warm ammonia stream 139 and cooled cracked ammonia stream 142. Ammonia heat exchanger 138 may be heat integrated with reboiler 113, thereby providing at least a portion of the required heat (not shown). Ammonia furnace fuel stream 143, and optionally ammonia fuel stream 111, are introduced into ammonia cracking reactor 140, along with warm ammonia stream 139, thereby producing hot cracked ammonia stream 141 and ammonia furnace raw flue gas stream 144. Ammonia furnace raw flue gas stream 144 is then introduced, along with ammonia stream for SCR 146, and optionally either one or both of first SCR stream 106 and/or second SCR stream 112, into selective catalytic reformer 145, thereby producing treated flue gas stream 147.

Now turning to FIGS. 1 and 2, inlet stream 101 is introduced into wash column 102, thereby producing at least clean gas stream 103 and wash column effluent stream 104. At least a portion of inlet stream 101 may be cooled cracked ammonia stream 142 from upstream ammonia cracking unit 135. At least a portion of the inlet to wash column 102 may be cooled recycle stream 129. Inlet stream 101 may contain unconverted ammonia in the range of 0.003 mol %-10 mol %. The remaining fraction consists of 25 mol % nitrogen and 75 mol % hydrogen.

After exiting ammonia heat exchanger 138, inlet stream 101 may enter wash column 102 with a temperature around 35° C. Cooled wash water stream 122 may enter wash column 102 at a temperature between 5° C. and 50° C. Cooled wash water stream 122 may be cooled in wash water cooler 121 using the cold of ammonia feed stream 123, which can be around −33° C., which is thus warmed and resulting warm ammonia feed stream 124 delivered to ammonia cracking unit 135.

Within wash column 102, the ammonia that is present in inlet steam 101 is absorbed in a counter current flow of water and leaves as clean gas stream 103 with a remaining ammonia concentration between of 50 ppm and 2500 ppm. This ammonia concentration in clean gas stream 103 is now low enough to allow the separation of the hydrogen and nitrogen downstream. Clean gas stream 103 may optionally be introduced into hydrogen nitrogen separation unit 148, thereby producing hydrogen-rich stream 149 and/or nitrogen-rich stream 150. Hydrogen nitrogen separation unit 148 may utilize an absorptive or a cryogenic process.

The concentration of ammonia in wash column effluent stream 104 may be in the range of 1 mol % and 20 mol % which is high enough that optionally first SCR stream 106 may be used in selective catalytic reforming (SCR) unit 145. Optionally, in order to increase the ammonia concentration in wash column effluent stream 104, recycle stream 125 may enter recycle pump 126, thereby producing pressurized recycle stream 127. Pressurized recycle stream 127 may enter recycle cooler 128, thereby producing cooled recycle stream 129. Cooled recycle stream 129 may then be introduced into wash column 102.

Wash column effluent stream 104 may then exchange heat indirectly in heat exchanger 107 with pressurized wash water stream 119, thereby producing cooled effluent stream 108, and warmed wash water stream 120. Cooled effluent stream 108 is loaded with ammonia and is then to be treated in stripper/recovery column 109. Warm condenser stream 131 exits stripper column 109 and enters condenser 130, wherein it is condensed (and cooled) by cold condenser inlet stream 133, thereby producing cold condenser stream 132. As cold condenser stream 132 reenters stripper column 109, the fluid inside is cooled. By controlling the reflux flowrate through condenser 130, and the flowrate and temperature of cold condenser inlet stream 133, the temperature and water content of recovered ammonia stream 110 may be adjusted. Reboiler liquid stream 114 exits stripper column 109 and enters reboiler 113, wherein it is heated and vaporized by reboiler heat input stream 116, thereby producing reboiler vapor stream 115. As reboiler vapor stream 115 reenters stripper column 109, the ammonia within is evaporated. Reboiler heat input stream 116 may be steam. As an alternative to steam stream 116, reboiler 113 may be directly thermally integrated to the waste heat recovery system of the cracking process (not shown).

Recovered ammonia stream 110, is a gas containing recovered ammonia in the range of 20 mol %-100 mol %, with the remaining fraction being predominantly water. As the pressure is at around 2 bar, at least a portion, 111, may be recycled to fuel stream 143 of ammonia cracking unit 135 or a portion, second SCR stream 112, may be sent to SCR unit 145 without the need of compression. In one embodiment, at least a portion, recovered ammonia product stream 134, of recovered ammonia stream 110 is removed from the system as a product stream. Due to the temperature range of recovered ammonia stream 110 being between 30° C. and 120° C., it may be used to thermally integrate another stream of the plant, such as the preheating of the combustion air or fuel (not shown).

Cleaned wash water stream 117 has the pressure increased in wash water pump 118, thereby producing pressurized wash water stream 119. Pressurized wash water stream 119 then exchanges heat with wash column effluent stream 104, thereby producing warmed wash water stream 120. Warmed wash water stream 120 is cooled in wash water cooler 121, thereby producing cooled was water stream 122. Cooled wash water stream 122 is reintroduced into wash column 102, and thus continuously cycled. The lost water in recovered ammonia stream 110 is made up with makeup water stream 105.

The SCR process is exothermic, exhibits a temperature window for optimal operation and required dosing of ammonia. The temperature in the SCR can be influenced by the selection of the ammonia stream. Stream 104 is liquid and stream 110 is gaseous. Choosing one of these streams or a mixture thereof for the ammonia dosing, the temperature in the flue gas duct can be adjusted and the addition of external ammonia for the SCR unit can be reduced or avoided.

| Stream | Parameter | Case 1 | Case 2 | Case 3 | Case 4 | Case 5 | Case 6 |
|---|---|---|---|---|---|---|---|
| 101 | c(NH3) in mol % | 0.3 | 0.3 | 10 | 10 | 0.3 | 10 |
| 101 | T in ° C. | 35 | 35 | 35 | 35 | 25 | 25 |
| 101 | p in bar(a) | 25 | 25 | 25 | 25 | 25 | 25 |
| 103 | c(NH3) in ppm | 50 | 2500 | 50 | 2500 | 5 | 5 |
| 104 | c(NH3) in mol % | 4 | 5 | 12 | 15 | 4 | 12 |
| 110 | c(NH3) in mol % | 99.6 | 99.7 | 99.9 | 99.9 | 99.6 | 99.9 |
| 110 | T in ° C. | 48 | 46 | 42 | 41 | 47 | 42 |
| 110 | p in bar(a) | 2 | 2 | 2 | 2 | 2 | 2 |
| 116 | Q in kW/kg NH3 recovered | 3 | 2 | 1 | 1 | 3 | 1 |
| 105 | Makeup water/Circulating water Mass flow basis | 3% | 21% | 0.5% | 2% | 2% | 0.3% |

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of separating and reusing unconverted ammonia from cracked ammonia gas provided by an ammonia cracking unit, comprising:

introducing a cracked ammonia gas stream into a water wash column, thereby producing a clean gas stream and a water-containing effluent stream, introducing the water-containing effluent stream into a stripping column, thereby producing a cleaned wash water stream and a recovered ammonia stream, wherein the cracked ammonia gas stream has an ammonia concentration of between 0.003 mol % and 10 mol %, wherein the clean gas stream has an ammonia concentration of between 1 ppm and 2500 ppm, and wherein at least a portion of the recovered ammonia stream is used as fuel within the ammonia cracking unit, wherein the cleaned wash water stream is cooled in indirect heat exchange with an ammonia feed stream, thereby producing a cooled wash water stream, and wherein the cooled wash water stream has a temperature of between 5° C. and 50° C.

2. The method of claim 1, wherein a portion of the recovered ammonia stream is used in a selective catalytic reforming unit within the ammonia cracking unit.

3. The method of claim 1, wherein a selective catalytic reforming unit within the ammonia cracking unit is provided at least a portion of a required ammonia stream from the water-containing effluent stream, the recovered ammonia stream, or both.

4. The method of claim 1, wherein the stripping column comprises a reboiler, and where the reboiler uses steam as at least a partial heat source.

5. The method of claim 1, wherein the stripping column comprises a reboiler, wherein the ammonia cracking unit comprises a waste heat recovery heat exchanger, and wherein the reboiler is heat integrated with the waste heat recovery heat exchanger as at least a partial heat source.

6. The method of claim 1, wherein the wash column operates at a pressure that is between 20 bara and 35 bara, and operates at a temperature that is between 10° C. and 50° C.

7. The method of claim 1, wherein the stripping column operates at a pressure that is between 1 bara and 3 bara.

8. The method of claim 1, wherein the water-containing effluent stream has an ammonia concentration, and wherein at least a portion of the water-containing effluent stream is recirculated and introduced into the water wash column, thereby modifying the ammonia concentration.

9. The method of claim 1, wherein the water-containing effluent stream is heated in indirect heat exchange with at least a portion of the cleaned wash water stream, prior to being introduced into the stripping column.

10. The method of claim 1, further comprising returning the cleaned wash water stream to the water wash column, and adding a make-up water stream to the water wash column,
- wherein the cleaned wash water stream has a first flowrate,
- wherein the make-up water stream has a second flowrate, and
- wherein the second flowrate is between 0.3% and 21% of the first flowrate.

11. The method of claim 1, wherein at least a portion of the recovered ammonia stream is exported as a product stream.

12. The method of claim 1, wherein the stripping column further comprises an overhead condenser, comprising a cold condenser inlet stream,
- wherein the cold condenser inlet stream has a temperature and a flowrate,
- wherein the recovered ammonia stream has a temperature and a water content,
- where the temperature and/or the water content of the recovered ammonia stream may be adjusted by controlling the temperature and/or flowrate of the cold condenser inlet stream.

* * * * *